United States Patent [19]
Nerone et al.

[11] Patent Number: 5,408,403
[45] Date of Patent: Apr. 18, 1995

[54] POWER SUPPLY CIRCUIT WITH POWER FACTOR CORRECTION

[75] Inventors: Louis R. Nerone, Brecksville; David J. Kachmarik, North Olmsted, both of Ohio

[73] Assignee: General Electric Company, Schenectady, N.Y.

[21] Appl. No.: 934,843

[22] Filed: Aug. 25, 1992

[51] Int. Cl.[6] .................. H02M 5/458; G05F 1/70
[52] U.S. Cl. .................. 363/37; 363/89; 363/98; 363/132; 323/222; 323/224; 315/247
[58] Field of Search .............. 323/207, 222, 223, 224, 323/266, 271, 282, 289; 363/17, 55, 56, 57, 58, 98, 132, 101, 37, 89; 315/247

[56] References Cited

U.S. PATENT DOCUMENTS

| | | | |
|---|---|---|---|
| 4,264,949 | 4/1981 | Simmons et al. | 363/17 |
| 4,533,986 | 8/1985 | Jones | 363/17 |
| 4,985,819 | 1/1991 | Mori et al. | 363/37 |
| 5,019,952 | 5/1991 | Smolenski et al. | 363/16 |
| 5,072,355 | 12/1991 | Huillet | 363/89 |
| 5,082,998 | 1/1992 | Yoshioka | 363/37 X |
| 5,181,159 | 1/1993 | Peterson et al. | 363/89 |
| 5,251,119 | 10/1993 | Maehara | 363/37 |
| 5,303,140 | 4/1994 | Shimizu | 363/132 |
| 5,359,274 | 10/1994 | Bandel | 323/207 |

Primary Examiner—Thomas M. Dougherty
Assistant Examiner—Adolf Berhane
Attorney, Agent, or Firm—George E. Hawranko; Stanley C. Corwin

[57] ABSTRACT

A power supply circuit for powering a load with bi-directional current comprises means for supplying d.c. power from an a.c. voltage, a series half-bridge converter, and a boost converter. The series half-bridge converter alternately impresses a d.c. bus voltage from a bus conductor across a load circuit first with one polarity and then with the opposite polarity. The series half-bridge converter includes a first switch interposed between the bus conductor and a bridge-switch end of the load circuit; a second switch interposed between ground and the bridge-switch end of the load circuit; and a switching control circuit for alternately switching on the first and second switches. The boost converter comprises a boost capacitor connected between the bus conductor and ground and whose level of charge determines the bus voltage on the bus conductor; a boost inductor for storing energy from the means for supplying d.c. power, the boost inductor being connected by a one-way valve to the boost capacitor for discharging its energy into the boost capacitor; and means for periodically connecting a load end of the boost inductor through a low impedance path to ground, such path including a boost switch. A condensed power supply circuit results from making the second switch of the series half-bridge converter additionally serve as the boost switch. An alternative circuit simplification results from making constant the ratio of on time to switching repetition period of the boost switch.

19 Claims, 3 Drawing Sheets

POWER SUPPLY CIRCUIT WITH POWER FACTOR CORRECTION

FIELD OF THE INVENTION

The present invention relates to circuits for both powering a load with bi-directional current and improving the power factor of the load.

BACKGROUND OF THE INVENTION

A prior art circuit for supplying a load with bi-directional current includes a series half-bridge converter comprising a pair of series-connected switches which are alternately switched on to achieve bi-directional current flow through the load.

In order to improve the power factor of the load, the prior art power supply circuit incorporates a boost converter which receives rectified, or d.c., voltage from a full-wave rectifier, which, in turn, is supplied with a.c. voltage and current. The boost converter generates a voltage boosted above the input d.c. voltage on a capacitor of the boost converter ("the boost capacitor"), which supplies the d.c. bus voltage for powering the mentioned series half-bridge converter. The prior art boost converter includes a dedicated switch ("the boost switch") which repetitively connects an inductor of the boost converter ("the boost inductor") to ground and thereby causes current flow in the such inductor, and hence energy storage in the inductor. The energy stored in the boost inductor is then directed to the boost capacitor, to maintain a desired bus voltage on such capacitor.

In the operation of the prior art boost converter, the energy stored in the boost inductor is completely discharged into the boost capacitor prior to the boost switch again connecting the boost inductor to ground. Operation of the boost converter as described, i.e. with complete energy discharge of the boost inductor, is known as operation in the discontinuous mode of energy storage.

The described prior art power supply circuit has been found to achieve a typical power factor of about 0.98; it has also been found to result in a total harmonic distortion of the a.c. input current supplied to the full-wave rectifier of less than about 13%, which distortion arises from the power supply circuit drawing an a.c. current that departs from a perfect sinusoidal waveform.

One drawback of the described prior art circuit is that its overall gain typically has a wide variation, especially when powering such loads as a fluorescent lamp whose loading varies considerably in normal operation. This can cause a large ripple in the voltage applied to the load, with the ratio of actual voltage to r.m.s. voltage exceeding 1.7. It would be desirable if such ratio, known as the crest factor, could be maintained below about 1.7. This would reduce fatigue on a fluorescent lamp load, for instance, that would otherwise shorten lamp life.

OBJECTS AND SUMMARY OF THE INVENTION

Accordingly, it is an object of the present invention to provide a circuit for powering a load with bi-directional current and providing a high degree of power factor correction.

Another object of the invention is to provide a power supply circuit of the foregoing type that is condensed in relation to the prior art power supply circuit described above, to achieve compactness and economy of the circuit.

In accordance with the invention, a power supply circuit for powering a load with bi-directional current is provided. The circuit comprises means for supplying d.c. power from an a.c. voltage, a series half-bridge converter, and a boost converter. The series half-bridge converter alternately impresses a d.c. bus voltage from a bus conductor across a load circuit first with one polarity and then with the opposite polarity. The series half-bridge converter includes a first switch interposed between said bus conductor and a bridge-switch end of the load circuit; a second switch interposed between a ground conductor and the bridge-switch end of the load circuit; and a switching control circuit for alternately switching on the first and second switches. The boost converter comprises a boost capacitor connected between the bus and ground conductors and whose level of charge determines the bus voltage on the bus conductor; a boost inductor for storing energy from the means for supplying d.c. power, the boost inductor being connected by a one-way valve to the boost capacitor for discharging its energy into the boost capacitor; and means for periodically connecting a load end of the boost inductor through a low impedance path to the ground conductor and thereby charging the boost inductor, such path including a boost switch. A condensed power supply circuit results from making the second switch of the series half-bridge converter additionally serve as the boost switch. An alternative circuit simplification results from making constant the ratio of on time to switching repetition period of the boost switch.

BRIEF DESCRIPTION OF THE DRAWING

The foregoing objects and further advantages and features of the invention will become apparent from the following specification taken in conjunction with the appended drawing, in which.

DETAILED DESCRIPTION OF THE PREFERRED EMBODIMENT

Figure 1:
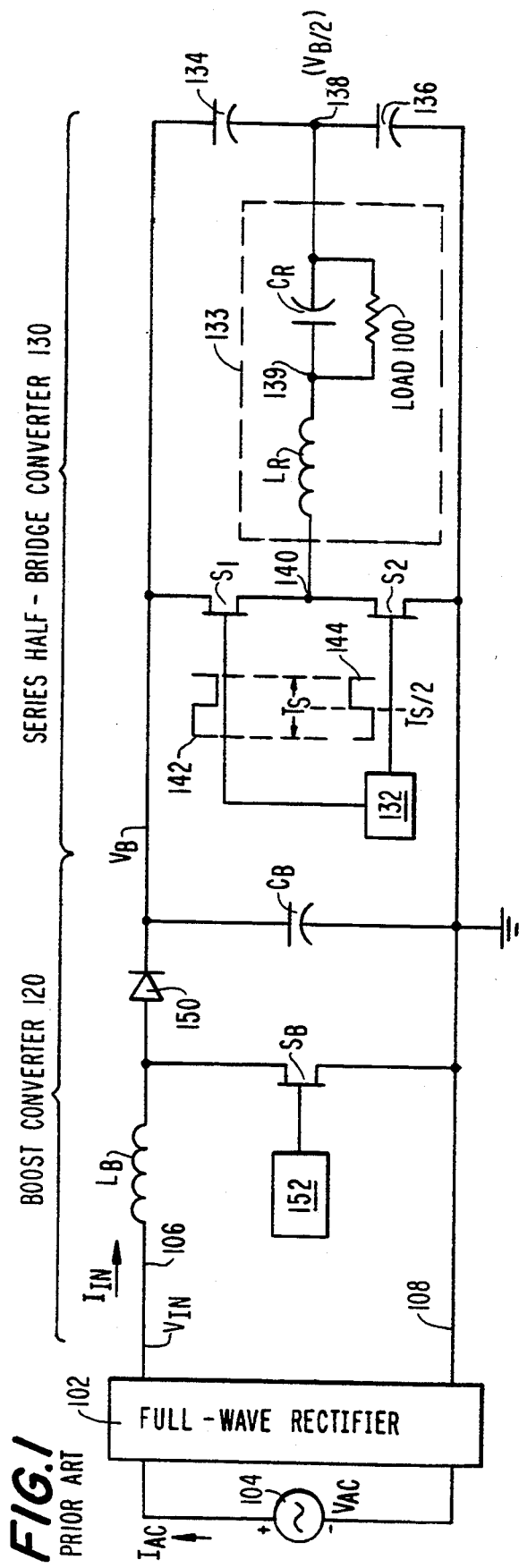
FIG. 1 is a simplified schematic of a prior art circuit for powering a load with bi-directional current.

To introduce concepts that will assist in understanding the present invention, the prior art circuit of FIG. 1 is first described. FIG. 1 shows a simplified schematic of a prior art power supply circuit for a load 100, such as a low pressure discharge lamp, e.g., a fluorescent lamp. The prior art power supply circuit uses a full-wave rectifier 102 to rectify a.c. voltage $V_{AC}$ supplied from a source 104, to thereby provide a rectified, or d.c., voltage on conductor 106 with respect to a ground, or reference-voltage, conductor 108. A boost converter 120 of known construction then provides a bus voltage $V_B$ on the upper terminal of a boost capacitor $C_B$. The bus voltage $V_B$ is boosted above the d.c. voltage $V_{IN}$ input to the boost converter, as explained below.

The boosted bus voltage $V_B$ is then applied to the upper switch $S_1$ of a series half-bridge converter 130. Upper switch $S_1$ is alternately switched with lower switch $S_2$, by a switch control circuit 132, to provide bi-directional current flow through a load circuit such as a resonant circuit 133. Resonant circuit 133 includes a load 100, which is shown by way of illustration as a resistive load characterizing a fluorescent lamp. Load 100 is connected between a node 138 to its right and a node 139 to its left. A resonant capacitor $C_R$ is connected in parallel with load 100, and a resonant inductor $L_R$ is connected between node 139 to its right and a node 140 to its left, so as to be in series with resonant capacitor $C_R$. Capacitors 134 and 136 maintain the voltage at their common node 138 at one-half the bus voltage, or $V_B/2$.

To provide bi-directional current to resonant circuit 133, switch $S_1$ is momentarily turned on (i.e., made to conduct) and switch $S_2$ turned off, so that the voltage $V_B/2$ (i.e. $V_B - V_B/2$ on node 138) is impressed across resonant circuit 133 from a node 140 on its left to a node 138 on its right. Then, switch $S_2$ is momentarily turned on and switch $S_1$ off, so that a voltage of $-V_B/2$ (or $0 - V_B/2$ on node 138) is impressed across resonant circuit 133 from node 140 to node 138.

Switch control circuit 132 provides switch signals such as shown at 142 and 144 for controlling switches $S_1$ and $S_2$, respectively. As mentioned, switches $S_1$ and $S_2$ are alternately switched; that is, with switch signal 142 in a high state, switch signal 144 is in a low state, and vice-versa. Typically, switch signals 142 and 144 alternate at one-half of the illustrated switching repetition period $T_S$ of the switch signals, or at $T_S/2$.

Referring to boost converter 120, it was explained above that the bus voltage $V_B$ constitutes the voltage on boost capacitor $C_B$. The voltage on boost capacitor $C_B$ results from charge provided from a boost inductor $L_B$, through a one-way valve 150, such as a p-n diode. Boost inductor $L_B$, in turn, is repeatedly energized through the intermittent switching action of a boost switch $S_B$, which is controlled by a switch control circuit 152. When switch $S_B$ is turned on, the input current $I_{IN}$ to boost conductor $L_B$ increases in a generally linear fashion until switch $S_B$, under control of circuit 152, turns off. The energy in boost inductor $L_B$ is then discharged into boost capacitor $C_B$ through one-way valve 150. During discharge of boost inductor $L_B$, a positive voltage from left to right across inductor $L_B$ augments the input voltage $V_{IN}$, to thereby produce a boosted bus voltage $V_B$ on the upper terminal of boost capacitor $C_B$.

Figure 2:
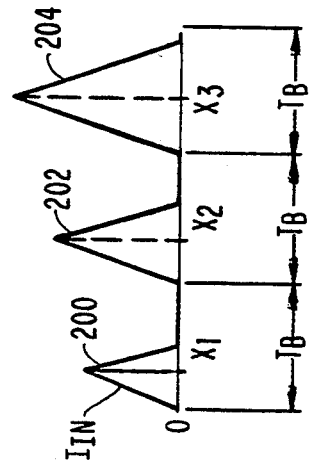

A typical current waveform for the input current $I_{IN}$ in boost inductor $L_B$ is shown in FIG. 2. As shown in that figure, input current $I_{IN}$ comprises approximately triangular waveforms 200, 202, 204, etc. Triangular waveform 200, for instance, ramps up at a generally linear rate to a peak value, and then decreases to zero as the energy of the inductor discharges into the boost capacitor $C_B$. Succeeding triangular waveforms follow a similar pattern, but increase to a higher peak value before discharging into the capacitor. The higher peak value of waveform 202 mainly results from a rising value of input voltage $V_{IN}$; the converse is true when the input voltage $V_{IN}$ is falling. Typically contributing to the higher value for waveform 202, also, is a delay in the switching point $X_2$ within the respective switching period $T_B$ of waveform 202 with respect to switching point $X_1$ in the preceding period $T_B$. In the same manner, triangular waveform 204 reaches a still higher peak value than the preceding waveform 202, with a higher input voltage $V_{IN}$ and an even more delayed switching point $X_3$.

Figure 3:
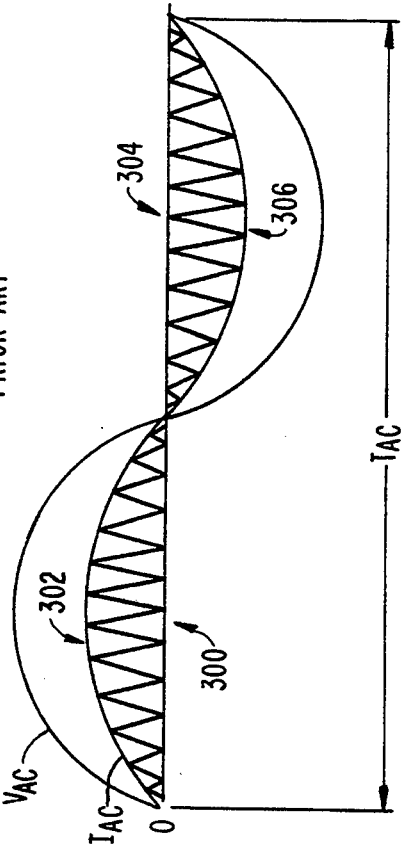
FIGS. 2 and 3 are waveforms for explaining the operation of the prior art circuit of FIG. 1.

Boost inductor $L_B$ conducts, as input current $I_{IN}$, a series 300 of triangular current waveforms, as shown in FIG. 3. As a result, the a.c. line current $I_{AC}$ from source 104 approximates a sinusoidal waveform 302. The a.c. current $I_{AC}$, further, is smoothed through the filtering action of an input filter network (not shown) for boost converter 120, such as shown, for instance, in R. P. Severns and G. Bloom, "Modern DC-to-DC Switchmode Power Converter Circuits," New York: Van Nostrand, Reinhold Co., 1985, pp. 55–61. A further filter capacitor, not shown, typically is placed in parallel with a.c. source 104 to reduce electromagnetic interference in the frequency range of 400 hz–500 Khz. The foregoing several filter components collectively function as a low pass filter to smooth the effects of the relatively jagged triangular waveforms of the input current $I_{IN}$ to boost converter 120. Owing to the rectification in full-wave rectifier 102, triangular current waveforms $I_{IN}$ that are positive are translated into negative waveforms during the negative half of a period $T_{AC}$ (FIG. 3) of the input a.c. voltage $V_{AC}$. Due to the low pass filtering action mentioned, the negative waveforms 304 appear as an approximately sinusoidal waveform 306.

The a.c. current $I_{AC}$ supplied from source 104, i.e., waveforms 302 and 306, beneficially is closely in phase with the a.c. voltage $V_{AC}$ from source 104. The combination of such closely in-phase relationship and the approximately sinusoidal nature of the a.c. current $I_{AC}$ result in a high power factor for the circuit of FIG. 1. The sinusoidal nature of the a.c. current $I_{AC}$ also reduces the total harmonic distortion of the a.c. current $I_{AC}$. These various benefits result from the use of boost converter 120, as is apparent from the foregoing description.

The present invention provides a power supply circuit that also realizes, in addition to the foregoing benefits of the prior art FIG. 1 circuit, benefits including a reduced number of circuit components, which condenses the circuit size, and is particularly desirable for achieving compactness in a fluorescent lamp.

Figure 4:
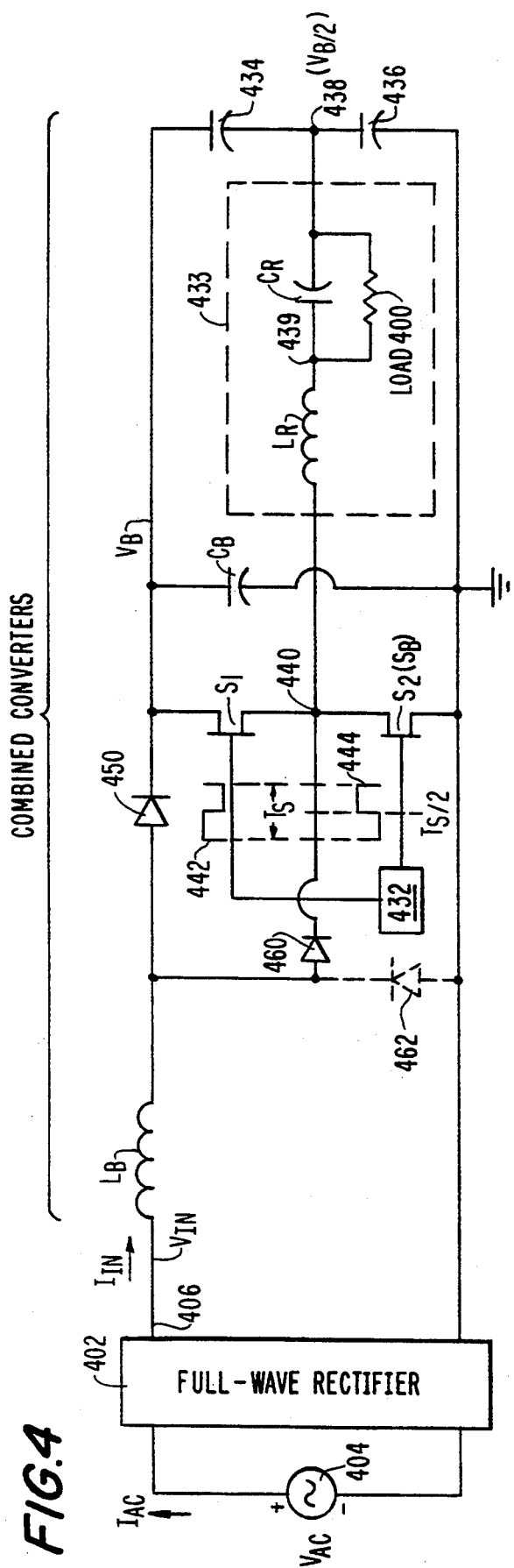
FIG. 4 is a simplified schematic of a condensed circuit for powering a circuit with bi-directional current in accordance with the invention.

FIG. 4 shows an exemplary version of a condensed power supply circuit according to the invention. In FIG. 4, parts similar to those described in connection with FIG. 1 share like reference numerals; only the first digit of the reference numeral, relating to figure number, is different.

FIG. 4 may contain a series half-bridge converter having parts similar to those in the series half-bridge converter 130 of prior art FIG. 1. However, the configuration of a boost converter in FIG. 4 and its interaction with the series half-bridge converter in FIG. 4 differs from the prior art FIG. 1 arrangement.

In FIG. 4, energy transfer from boost inductor $L_B$ to boost capacitor $C_B$ occurs through one-way valve 450, corresponding to one-way valve 150 in prior art FIG. 1. The charging path for boost conductor $L_B$ of FIG. 4, however, is markedly different from the corresponding charging path in FIG. 1 that includes boost switch $S_B$ connected from the "load" side of inductor $L_B$ to ground. Rather, in FIG. 4, the charging path for boost inductor $L_B$ includes the lower switch $S_2$ of a series half-bridge converter, which switch $S_2$ consequently serves dual purposes. When switch $S_2$ is on (i.e. conducting), charging current from boost conductor $L_B$ flows through such switch via one-way valve 460, such as a p-n diode. A further one-way valve 462, such as a p-n diode, may be connected with its anode grounded and its cathode connected to the "load" side of boost conductor $L_B$. One-way valve 462 serves as a precaution to minimize parasitic voltage caused by a resonant interaction between boost inductor $L_B$ and a parasitic capacitance (not shown) between the output electrodes of switch $S_2$.

Since boost switch $S_B$ in FIG. 4 lacks an independent switch control circuit, such as circuit 152 in prior art FIG. 1, the boost converter operates under the typically more limited control of a switch control circuit 432 for switch $S_2$ (as well as switch $S_1$). Such circuit 432 typically provides a ratio of switch on time to a constant switching repetition period of about 0.5. This allows for a simplified power supply circuit in contrast to prior art FIG. 1, which typically uses a complex switch control circuit 152 providing an adjustable ratio of switch on time to switching repetition period for boost switch $S_B$. This is believed a departure from prior art practice, in addition to the preferred extra-function role of switch $S_2$ in FIG. 4 of serving as a boost switch.

For cost considerations, control circuit 432 is preferably of the self-oscillating type, wherein the switching repetition period of bridge switches $S_1$ and $S_2$ is determined by the resonant frequency of resonant circuit 433, and is constant. A control circuit 432 of this type is described in the following, co-pending application, assigned to the instant assignee: application Ser. No. 07/766,489, filed Sep. 26, 1991, entitled, "Electronic Ballast Arrangement for a Compact Fluorescent Lamp," by L. R. Nerone, one of the instant inventors.

Figure 5:
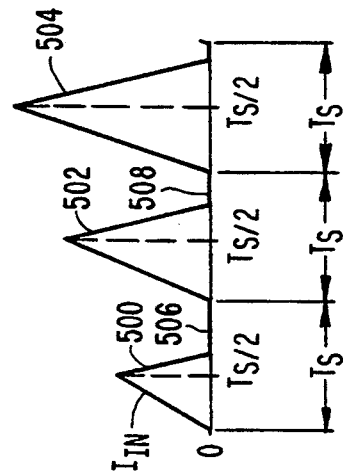

As waveforms 442 and 444 in FIG. 4 indicate, switch control circuit 432 turns switch $S_2$ on for half the switching period $T_S$, or $T_S/2$. This is also shown in FIG. 5, wherein successive waveforms 500, 502 and 504 of input current $I_{IN}$ each have a charging portion, or upward ramp, while switch $S_1$ is on that terminates at $T_S/2$, or half way through the switching period $T_S$ of switches $S_1$ and $S_2$. The increasing peak values of successive waveforms in FIG. 5 results from an increasing voltage $V_{IN}$ produced by full-wave rectifier 402 as the input a.c. voltage $V_{AC}$ sinusoidally increases; the converse is true when the input a.c. voltage decreases.

The triangular waveforms of FIG. 5 differ from the prior art waveforms of FIG. 2 by having a fixed switching point at half-way though a switching period $T_S$ (i.e. at $T_S/2$), rather than at the selectable switching points $X_1$, $X_2$, etc. in FIG. 2. Boost inductor $L_B$ in FIG. 4 thus has a fixed charging cycle of one-half of a switching period, in contrast to boost inductor $L_B$ of prior art FIG. 1.

Figure 6:
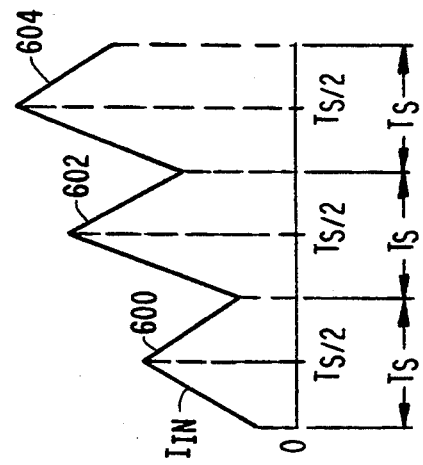
FIGS. 5–7 and 7A are waveforms for explaining the operation of the circuit of FIG. 4, FIG. 7A being a detail view of a modification taken at bracket 710 in FIG. 7.

On the other hand, the waveforms of FIG. 5 are similar to the waveforms of FIG. 2 in regard to indicating complete discharge of current from the boost inductor $L_B$ between successive charging cycles, as shown by troughs 506 and 508 between triangular waveforms in FIG. 5, for example. Energy storage in this mode, in which the boost inductor completely discharges, is known as discontinuous energy storage. In addition to operating in the discontinuous mode, the invention of FIG. 4 may, alternatively, utilize for part of the period of the input a.c. voltage $V_{AC}$ a continuous mode of energy storage in the boost inductor. The continuous mode of energy storage is shown in FIG. 6, wherein successive triangular current waveforms 600, 602 and 604 all have non-zero values. The increasing peak levels of the waveforms in FIG. 6 results mainly from an increasing level of sinusoidal input a.c. voltage $V_{AC}$; the converse is true when such a.c. voltage decreases.

Figure 7:
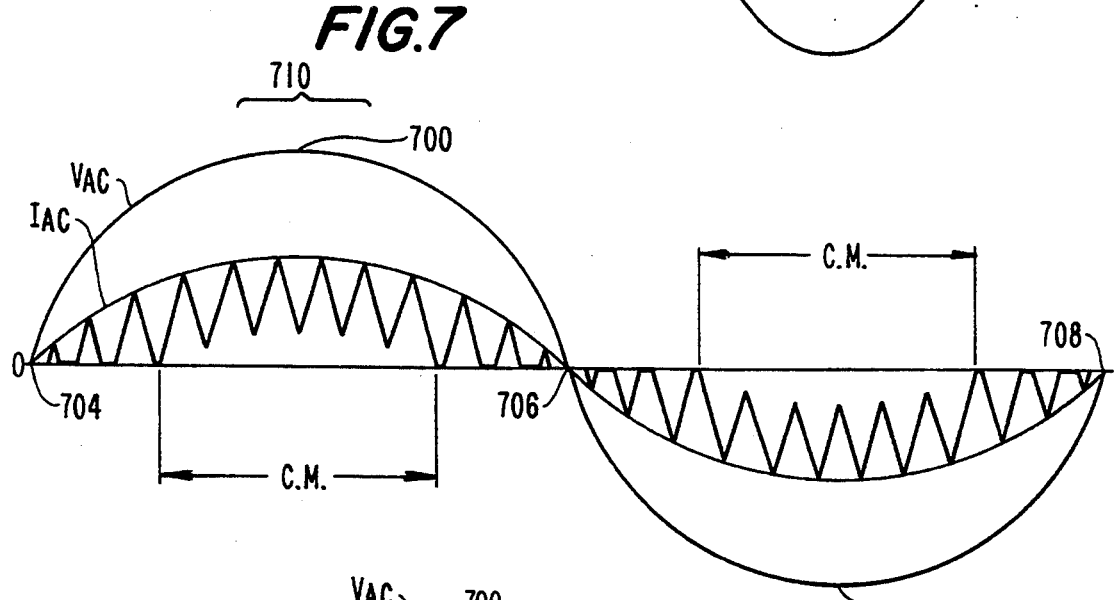

FIG. 7 illustrates operation of the boost convertor circuit of FIG. 4 in the continuous mode ("C.M."), centered about the peaks 700 and 702 of the input a.c. voltage $V_{AC}$. The remainder of the illustrated period of a.c. voltage $V_{AC}$ in FIG. 7 is characterized by operation in the discontinuous mode, centered about the zero crossings 704, 706 and 708 of a.c. voltage $V_{AC}$.

Operation of a boost converter solely in the discontinuous mode (not shown in FIG. 7) provides a highly improved power factor and a low total harmonic distortion (THD). Such operation typically achieves an improvement in power factor from about 0.5 to about 0.98, and a reduction in THD from about 170% to about 13%.

Operation solely in the discontinuous mode, however, has the disadvantage that the overall circuit has a widely varying gain. This is particularly true where load 400 comprises a fluorescent lamp, since the resistive loading of a fluorescent lamp varies significantly with various factors, such as applied power. Additionally, the series half-bridge converter of both FIGS. 1 and 4 inherently provides very little power control when operated, as they typically are, in the self-oscillating mode, as described, for instance, in the above-referenced application Ser. No. 07/766,489. The widely varying system gain adversely affects both the power stability of the load and the bus voltage $V_B$ applied to the load. Such widely varying gain, additionally, can give rise to large ripple on the output voltage. For fluorescent lamps in particular, a current ripple value, equalling the peak bus voltage $V_B$ divided by the r.m.s. bus voltage $V_B$, of 1.7 or less is typically required to avoid adverse effects on the lamp that shorten its useful life. This ripple specification is known as the crest factor.

The present inventors have discovered that the large variance in gain of the FIG. 4 circuit can be avoided by operating, for part of the input a.c. voltage period, in a continuous mode of energy storage. This is shown in FIG. 7 as continuous mode (C.M.) operation, which is centered about the peak values 700 and 702 of the input a.c. voltage $V_{AC}$. During the remainder of the period of the a.c. input voltage, the circuit operates in the discontinuous mode, centered about the zero crossings 704, 706 and 708 of the input a.c. voltage $V_{AC}$. Operation in the continuous mode is achieved through selection of values of the boost inductance $L_B$, the boost capacitance $C_B$, and the switching repetition period $T_S$ for switches $S_1$ and $S_2$, taking into account the loading of boost capacitor $C_B$. Such selection of values will be routine to those skilled in the art.

The following mathematical analysis guides in selecting the duration of operation in the continuous mode. In the continuous mode, the gain of the boost converter, i.e. the ratio of the bus voltage $V_B$ to the input voltage $V_{IN}$, varies as follows:

$$\text{Continuous-mode gain} = \frac{1}{1-D} \qquad (1)$$

where D is the ratio of on-time of boost switch $S_B$ to the repetition period $T_S$ of the boost switch, or 0.5 for the circuit of FIG. 4.

The circuit of FIG. 4 thus has a maximum gain of 2 in the continuous mode, which mode beneficially is centered about the highest values of input a.c. voltage $V_{AC}$.

In the discontinuous mode, the boost converter in FIG. 4 has a gain (i.e., $V_B/V_{IN}$) as follows:

$$\text{Discontinuous-mode gain} = \frac{1 + \sqrt{\frac{(1-2D)^2 L}{RT_S}}}{2} \qquad (2)$$

where

D is defined above in connection with equation 1 (i.e. 0.5 for the circuit of FIG. 4);

$L_B$ is the value of the boost inductance;

R is the overall load across the boost converter, i.e., between the upper terminal of the boost capacitor $C_B$ and ground in FIG. 4; and $T_S$ is the switching repetition period for boost switch $S_B$.

As will be appreciated by those skilled in the art, the value of inductance for the boost inductance $L_B$ must be kept below a critical value, above which conduction in the continuous mode will always occur. One useful expression for such critical value is:

$$\text{Critical value of } L_B = 2 \frac{RT_S}{D(1-D)^2} \qquad (3)$$

where R, $T_S$, and D are as defined above in connection with equations 1 and 2.

Typically, a maximum gain in the discontinuous mode on the order of about 2.6 or less is chosen by selecting values for the boost inductance $L_B$ and the repetition period $T_S$ of boost switch $S_B$ to satisfy equation 2 above. Because such a gain (e.g. 2.6) is centered about the zero crossing 704, 706 and 708 (FIG. 7), away from the peak values 700 and 702 of the a.c. voltage, the affect on the bus voltage $V_B$ is usually less than with the lower gain in the continuous mode (e.g. 2), which occurs near the peak values of the a.c. voltage.

The present inventors have discovered that operation of the circuit of FIG. 4 in the bi-modal arrangement as illustrated in FIG. 7 can result in a crest factor of below 1.7, with a power factor higher than about 0.9 (e.g. about 0.96) and a limitation of the total harmonic distortion of the input a.c. current $I_{AC}$ to about 25%. Actual waveforms for the input $V_{AC}$ and input period $I_{AC}$ are shown in FIG. 8.

Figure 8:
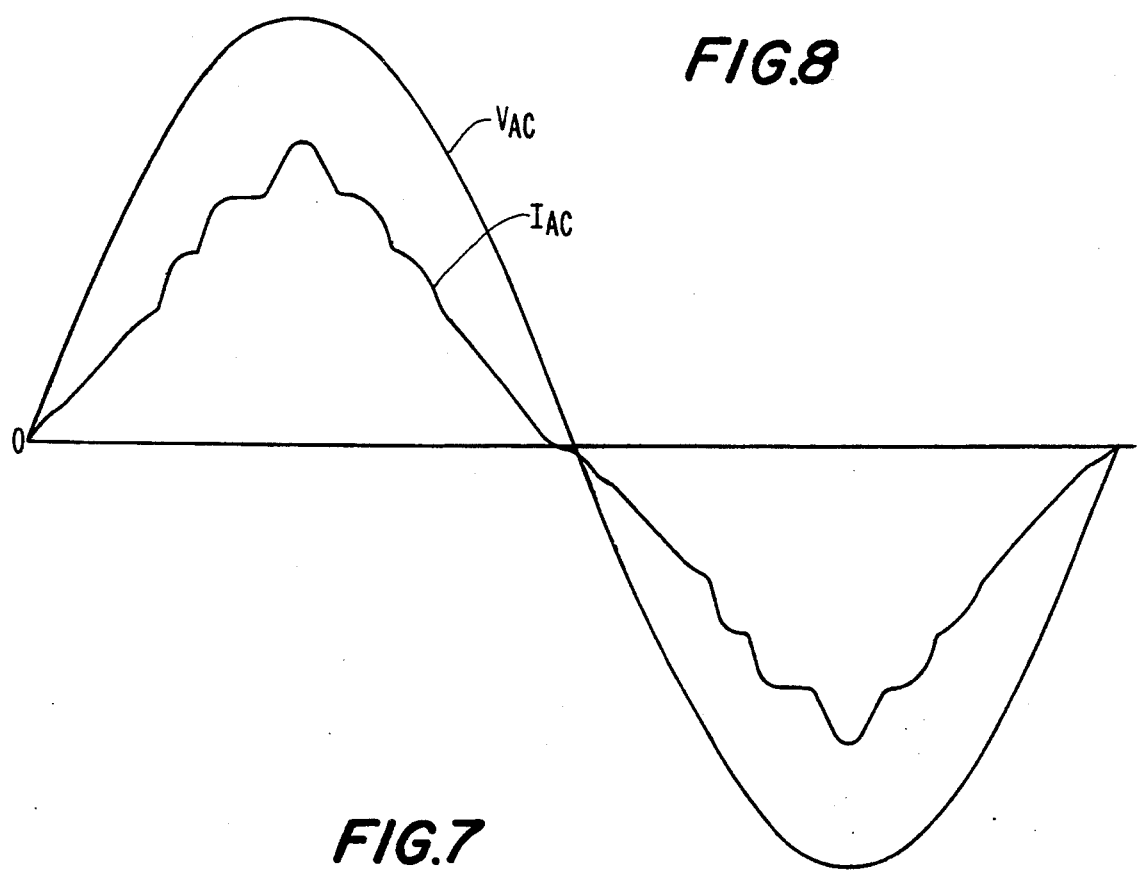
FIG. 8 shows waveforms from a circuit constructed in accordance with the principles of the present invention.

The FIG. 8 waveforms were produced using the following values for the components of the circuit of FIG. 4: inductance $L_B$, 2.9 millihenries; switching repetition period $T_S$ for boost switch $S_B$ (the same period for switches $S_1$ and $S_2$), 20 microseconds; D, as defined above in regard to equation 1, 0.5; boost capacitance $C_B$, 10 microfarads; capacitances 434 and 436, each 0.5 microfarads; resonant inductance $L_R$, 2.2 millihenries; resonant capacitance $C_R$, 2.2 nanofarads; and resistance of load 400, 600 ohms. The mentioned circuit also included filter elements not shown in FIG. 4. Thus, an input filter network for the boost converter comprised an inductance of 1 millihenry connected between the positive ("+") output of full-wave rectifier 402 and the a.c. source-side of boost inductor $L_B$, and a capacitance of 0.10 microfarads connected between the a.c. source-side of boost inductor $L_B$ and ground. A capacitance of 47 nanofarads for reducing electromagnetic interference on a.c. source 404 was connected between the output terminals of a.c. source 404.

Figure 7A:
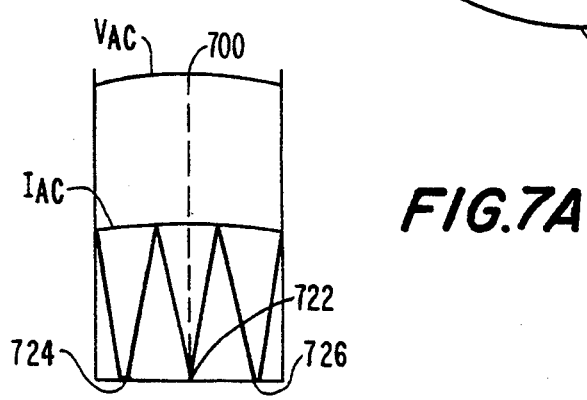

When the circuit of FIG. 4 is operated solely in the discontinuous mode of energy storage in the boost inductor, it is preferred that the duration of troughs, such as 506 and 508, shown in FIG. 5, approach zero at the peak of the input a.c. $V_{AC}$. FIG. 7A illustrates this condition. FIG. 7A is a detail view taken at bracket 710 in FIG. 7, but is modified to indicate only discontinuous mode operation. Thus, in the vicinity 722 of the peak 700 of the a.c. voltage $V_{AC}$, adjacent triangular waveforms join together near the zero axis, but away from such peak, troughs 724, 726 etc. separate adjacent waveforms. This provides for the highest power factor for the circuit of FIG. 4, and for the lowest total harmonic distortion of the current waveform in source 404 of a.c. power.

From the foregoing, it is apparent that the present invention provides a power supply circuit with a high level of power factor correction, and that such circuit may be condensed, if desired, in relation to a prior art circuit. It is further apparent that the inventive power supply circuit can be operated with a low value of total harmonic distortion of the input a.c. current. Further, operating the invention in both continuous and discontinuous energy storage modes in the boost inductor beneficially results in a low crest factor, or ripple voltage, on the load.

While the invention has been described with respect to specific embodiments by way of illustration, many modifications and changes will occur to those skilled in the art. It is, therefore, to be understood that the appended claims are intended to cover all such modifications and changes as fall within the true spirit and scope of the invention.

What is claimed is:

1. A condensed power supply circuit for powering a gas discharge lamp with bi-directional current, the circuit comprising:

(a) means for supplying d.c. power from an a.c. voltage;

(b) a series half bridge converter for alternately impressing a d.c. bus voltage from a bus conductor across a load circuit first with one polarity and then with an opposite polarity relative to said one polarity, said series half-bridge converter including:

(i) a first switch interposed between said bus conductor and a first node to which said load circuit is coupled;

(ii) a second switch interposed between a ground conductor and said first node; and (iii) a switching control circuit for alternately switching on said first and second switches; and (c) a boost converter comprising:

(i) a boost capacitor connected between said bus and ground conductors and whose level of charge determines the bus voltage on said bus conductor;

(ii) a boost inductor for storing energy from said means for supplying d.c. power, said boost inductor being connected by a diode to said boost capacitor for discharging its energy into said boost capacitor; and (iii) means for periodically connecting a load end of said boost inductor through a low impedance path to said ground conductor and thereby charging said boost inductor, said connecting means including a boost switch wherein said load end of said boost inductor is coupled to one terminal of said boost switch so that, in a first condition, said boost switch is effective so as to allow such charging of said boost inductor, and in a second condition, is effective so as to allow said boost inductor to discharge into said boost capacitor;

(d) said boost switch comprising said second switch of said series half-bridge converter.

2. The power supply circuit of claim 1, wherein said low impedance path includes a diode allowing current flow from said boost inductor to said boost switch.

3. The power supply circuit of claim 1, wherein:
(a) said switching control circuit is effective for switching on said first and second switches for substantially the same duration and at a predetermined switching repetition frequency; and
(b) said load circuit is a resonant circuit, and said switching repetition frequency is determined by a resonant frequency of said resonant load circuit.

4. The power supply circuit of claim 1, wherein said gas discharge lamp comprises a fluorescent lamp.

5. The power supply circuit of claim 1, wherein the inductance of said boost inductor and the frequency of switching of said switching control circuit are selected to cause said boost converter to operate with discontinuous energy storage in said boost inductor during at least a substantial period of said a.c. voltage.

6. The power supply circuit of claim 5, wherein said inductance and frequency are selected to cause said boost converter to operate with discontinuous energy storage in said boost inductor throughout substantially the entire period of said a.c. voltage.

7. The power supply circuit of claim 6, wherein:
(a) said switching control circuit is effective for switching on said first and second switches at a predetermined switching repetition frequency; and
(b) said load circuit is a resonant circuit, and said switching repetition frequency is determined by a resonant frequency of said resonant load circuit.

8. The power supply circuit of claim 5, wherein the inductance of said boost inductor and the frequency of switching of said switching control circuit are selected to cause said boost converter to operate with:
(a) discontinuous energy storage in said boost inductor during at least a substantial portion of the period of said a.c. voltage; and
(b) continuous energy storage in said boost inductor during at least another substantial portion of the period of said a.c. voltage.

9. The power supply circuit of claim 8, wherein said low impedance path includes a diode allowing current flow from said boost inductor to said boost switch.

10. The power supply circuit of claim 8, wherein said switching control circuit includes means for alternately switching on said first and second switches for substantially the same duration.

11. The power supply circuit of claim 8, where said inductance and frequency are selected to cause said power supply circuit to operate with the ratio of the peak bus voltage to r.m.s. bus voltage being less than about 1.7.

12. The power supply circuit of claim 11, wherein said inductance and frequency are selected to cause said power supply circuit to operate with a power factor in excess of 0.9.

13. The power supply circuit of claim 11, wherein said inductance and frequency are selected to cause said power supply circuit to operate with a power factor in excess of 0.96.

14. The power supply circuit of claim 11, wherein:
(a) said switching control circuit is effective for switching on said first and second switches at a predetermined switching repetition frequency; and
(b) said load circuit is a resonant circuit, and said switching repetition frequency is determined by a resonant frequency of said resonant load circuit.

15. A power supply circuit for powering a load with bi-directional current, the circuit comprising:
(a) means for supplying d.c. power from an a.c. voltage;
(b) a series half-bridge converter for alternately impressing a d.c. bus voltage from a bus conductor across a load circuit first with one polarity and then with an opposite polarity relative to said one polarity, said series half-bridge converter including:
(i) a first switch interposed between said bus conductor and a first node to which said load circuit is coupled;
(ii) a second switch interposed between a ground conductor and said first node; and
(iii) switching control circuit for alternately switching on said first and second switches; and
(c) a boost converter comprising:
(i) a boost capacitor connected between said bus and ground conductors and whose level of charge determines the bus voltage on said bus conductor;
(ii) a boost inductor for storing energy from said means for supplying d.c. power, said boost inductor being connected by a diode to said boost capacitor for discharging its energy into said boost capacitor; and
(iii) means for periodically connecting a load end of said boost inductor through a low impedance path to said ground conductor and thereby charging said boost inductor, said low impedance path including a boost switch;
(d) wherein the inductance of said boost inductor and the frequency of switching of said switch control circuit are selected to cause said boost converter to operate with discontinuous energy storage in said boost inductor during at least a substantial period of said a.c. voltage, and wherein said boost inductor is operated during peak regions of the period of said a.c. voltage in a continuous energy storage manner.

16. The power supply circuit of claim 15, wherein said ratio of on time of said boost switch to a switching repetition period of said boost switch is constant and is approximately 0.5.

17. The power supply circuit of claim 15, wherein:
(a) said switching control circuit is effective for switching on said first and second switches at a predetermined switching repetition frequency; and
(b) said load circuit is a resonant circuit, and said switching repetition frequency is determined by a resonant frequency of said resonant load circuit.

18. The power supply circuit of claim 15, wherein said load circuit includes a gas discharge lamp.

19. The power supply circuit of claim 18, wherein said gas discharge lamp is a fluorescent lamp.

* * * * *